March 4, 1969  E. C. IKE  3,431,031
VEHICLE BRAKE OPERATOR
Filed Jan. 28, 1965

INVENTOR.
ERNEST C. IKE
BY Gregg & Hinkson
ATTORNEYS

INVENTOR.
ERNEST C. IKE

BY *Trigg & Strickland*

ATTORNEYS

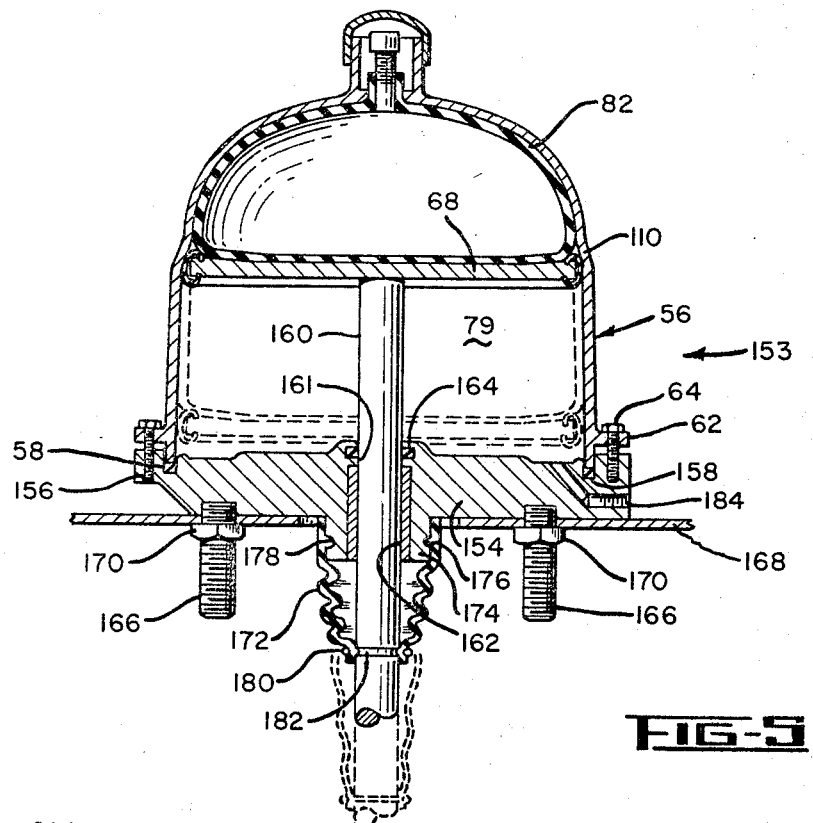
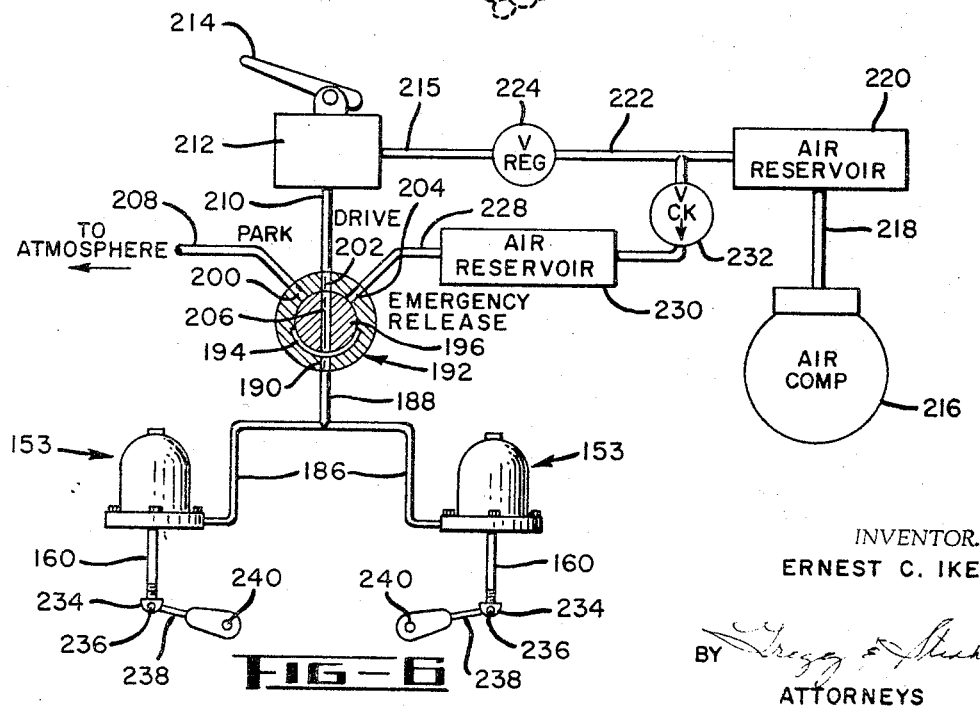

United States Patent Office 3,431,031
Patented Mar. 4, 1969

3,431,031
VEHICLE BRAKE OPERATOR
Ernest C. Ike, Cloverdale, Calif., assignor to Wiz Corporation, San Francisco, Calif., a corporation of California
Filed Jan. 28, 1965, Ser. No. 428,765
U.S. Cl. 303—9                                                         15 Claims
Int. Cl. B60t 13/46

ABSTRACT OF THE DISCLOSURE

A brake operating unit includes a cylinder and piston movable therein. One end of the cylinder is closed and means are provided to supply fluid under pressure to this closed end to move the piston into a brake released position. An air filled pressurized bladder is located in the other end of the cylinder and biases the piston toward the closed end of the cylinder. When pressure is released from the closed end of the cylinder the piston is moved by the pressurized bladder to the brake applied position.

---

This invention relates to an air brake operator and to an air brake system for vehicles such as buses, trucks, truck trailers and tractors and the like. Although "air" and "air brake" are referred to for convenience it will be understood that other compressible fluids and in appropriate cases incompressible fluids (liquids) may be used.

A typical air brake system for a vehicle such as a bus, truck, or the like includes separate brake means such as a brake shoe and drum at the vehicle wheels which brake shoes are actuated in one direction to apply the brakes and in the other direction to release the brakes. The brake means may serve as both service and parking brakes, and individual brake operators are located adjacent the wheels for actuation of said brake means. A typical brake operating mechanism includes a service brake unit by means of which the brakes are applied by application of air under pressure to said unit and are released by a resilient biasing means such as a light compression spring included therein. Often a parking brake unit is attached to or forms a part of said brake assembly. With prior art parking brakes, the brakes are applied by means of a strong compression spring included therein, and are released by application of air pressure to the unit to compress the spring. The large compression spring in the prior art parking brake units remains under compression at all times and in a typical device may supply a spring force of several thousand pounds. Because of such high compressive forces, the units are inherently dangerous and must be assembled and disassembled with great care. Often, the use of a press during assembly and disassembly of the unit is required. Further, such compression spring is subject to wear and breakage and often must be replaced. A broken or weak compression spring of course produces a very dangerous condition since such brakes are relied upon when parking and during emergency situations upon failure of the air pressure source.

An object of this invention is the provision of a brake operating mechanism in which the above mentioned shortcomings of the prior art mechanism are eliminated.

An object of this invention is the provision of a brake operator construction in which the need for the strong compression spring is eliminated.

An object of this invention is the provision of an air brake operating unit which may be assembled and disassembled by hand without the requirement of a press or the like.

An object of this invention is the provision of an improved brake operating assembly in which a single unit is employed both as a service brake and a parking brake actuating means.

An object of this invention is the provision of a simplified brake system in which both the parking and service brakes are actuated through a common air line connected to the brake unit.

An object of this invention is the provision of a brake system including service and parking brakes both of which are actuated to brake-released position by application of air under pressure and are actuated to brake-applied position by release of air therefrom.

An object of this invention is the provision of a novel indicating arrangement for indicating a low pressure condition of the bladder included in a brake operating unit.

These and other objects and advantages are obtained by means of a brake operating unit which includes a cylinder and piston reciprocably movable therein. One end of the cylinder is closed and means are provided for supplying fluid under pressure to said one end to move the piston to the other end of the cylinder into brake-released position. In accordance with this invention an expansible-contractible chamber filled with air or other compressible fluid under pressure is located in the other end of the cylinder. Typically the chamber may be an air filled bladder which resiliently biases the piston toward said one end of the cylinder. When pressure is released from the closed end of the cylinder the piston is moved by the pressurized bladder into brake applied position.

From the general gas law it is known that for any given mass of gas at a constant temperature the gas pressure is inversely related to the volume thereof. With this novel brake operating device, the gas volume is maximum in the brake-applied condition and minimum in the brake-released condition. Conversely, the gas pressure is at a minimum in the brake-applied condition and maximum in the brake-released condition. To minimize the change in bladder pressure between brake-applied and brake-released conditions, the change in volume between said conditions must be minimized. This may be done by simply using a large size cylinder. However, in some installations of the brake operator on the vehicle axle insufficient clearance is available for a large cylinder. In accordance with this invention, the air bladder may be connected through an air line or tube, to a remote air reservoir such as an air tank. With the increased air mass provided by such a reservoir, the pressure differential between brake-applied and brake-released conditions is reduced.

If desired, the brake operator may be provided with an indicating means to warn the operator when the air pressure within the bladder drops below a predetermined amount. Such an indicator may include a resilient biasing means between the bladder and cylinder which is normally biased to one position by the bladder when the bladder is properly pressurized. When the bladder pressure drops below a predetermined amount, the biasing means urges the bladder away from the cylinder wall. A member such as a switch actuating arm may be adapted for movement when said biasing means depresses the bladder for indication of a low bladder pressure condition.

In a modified form of this invention, both parking and service braking are accomplished by brake operating units which are released by application thereto of air under pressure and which are resiliently biased into brake-applied position when the air pressure is relieved. With this novel arrangement the units may be supplied with a single air pressure inlet which is adapted for connection to the parking or the service brake air control means included in the air supply system. The air supply system is also of a novel design and includes a pressure regulator for regulating the pressure of air applied to the brake operating unit for release of the brakes.

In the drawings wherein like reference characters refer to the same parts in the several views:

FIGURE 5 is a longitudinal cross sectional view of a modified brake operating mechanism which includes a single resilient biasing means for service, parking and emergency braking; and FIGURE 6 is a diagrammatic view of a brake system which includes a pair of brake operating mechanisms of the type shown in FIGURE 5.

Figure 1:
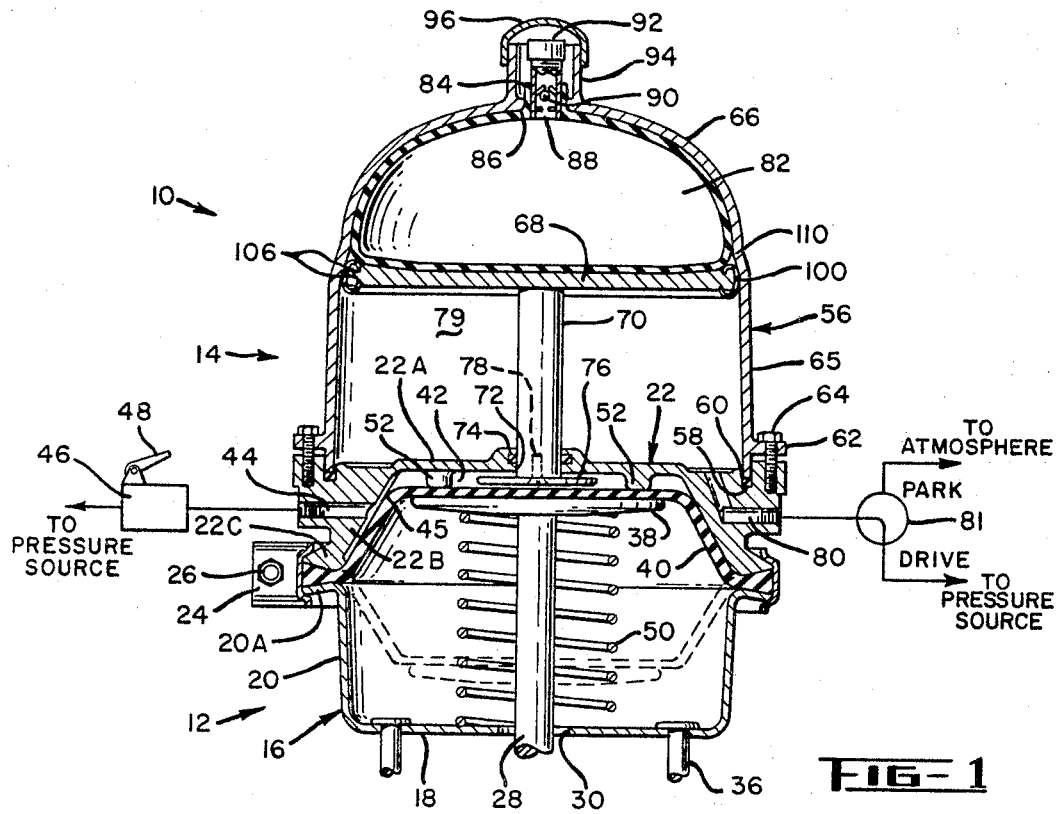
FIGURE 1 is a longitudinal cross sectional view of an air brake operating mechanism embodying this invention.

Reference is now made to FIGURE 1 of the drawings wherein there is shown an air brake operator 10 which includes a service brake unit 12 and a parking brake unit 14. The service brake unit 12 is substantially of well known construction and includes a dish-shaped case or housing 16 comprising an outer end wall 18 and side wall portion 20 formed with a radial flange 20a at the free end thereof. The open end of the case 16 is closed by an inner wall member 22 formed with an end wall 22a, side wall portion 22b and a radial flange 22c at the free end of the side wall. The inner end wall member 22 is attached to the case 16 by means of a clamp ring 24 which engages the flanges 20a and 22c thereon. The clamp ring may comprise a two piece member, which pieces are bolted together by nut and bolt fastening means 26, one of which is seen in FIGURE 1.

An axially movable brake actuating rod 28 extends through a clearance aperture 30 formed in the end member 18 of the case, and the outer end of the rod is adapted for connection through suitable linkage to a brake member such as a brake shoe at the wheel. Mounting studs 36 are fixedly secured to the outer end member 18 of the case and extend therefrom. The studs 36 are used to attach the unit to a bracket secured to the truck axle adjacent the brake to be actuated. Details of the connection of air brake to the brake means of a vehicle are well known and form no part of this invention.

The inner end of the brake actuating rod 28 is provided with a cylindrical diaphragm plate 38 which, in turn, is fastened to a flexible diaphragm 40. The outer rim or edge of the diaphragm is clamped tightly between the case 16 and inner wall member 22, and an air chamber 42 is formed between the diaphragm 40 and inner end wall member 22. A port 44 is formed through the side wall portion 22b of the wall 22 for connection of the chamber to a supply of air under pressure through a service brake valve 46. A groove 45 is formed in the inner tapered surface of the wall 22b for communication between the port and the inner side of the diaphragm. The valve 46 may comprise a modulating valve of conventional design which is adapted for actuation by a foot pedal 48 under control of the driver of the vehicle. For simplicity, the valve and connections thereto are diagrammatically illustrated in FIGURE 1. The space at the outer side of the diaphragm 40 is vented to the atmosphere and a light compression spring 50 between the diaphragm plate 38 and end wall 18 serves to resiliently bias the brake actuating rod 28 to the illustrated brake-released position. In order to apply the service brakes the pedal 48 is actuated to open the valve 46 for connection of the air pressure source to the chamber 42. When the chamber 42 is pressurized the diaphragm 40 together with the attached brake actuating rod 28 are moved in an outwardly direction into brake-applied position as shown in broken lines in FIGURE 1. When the air pressure is vented from the chamber 42 upon return of the valve 46 to the brake-released position the diaphragm 40 is returned to the illustrated solid line position by the return spring 50 to release the brakes. Stop members 52 are formed on the diaphragm side of the inner end wall member 22 for engagement with the diaphragm to limit the movement thereof in the brake-released direction.

Figure 2:
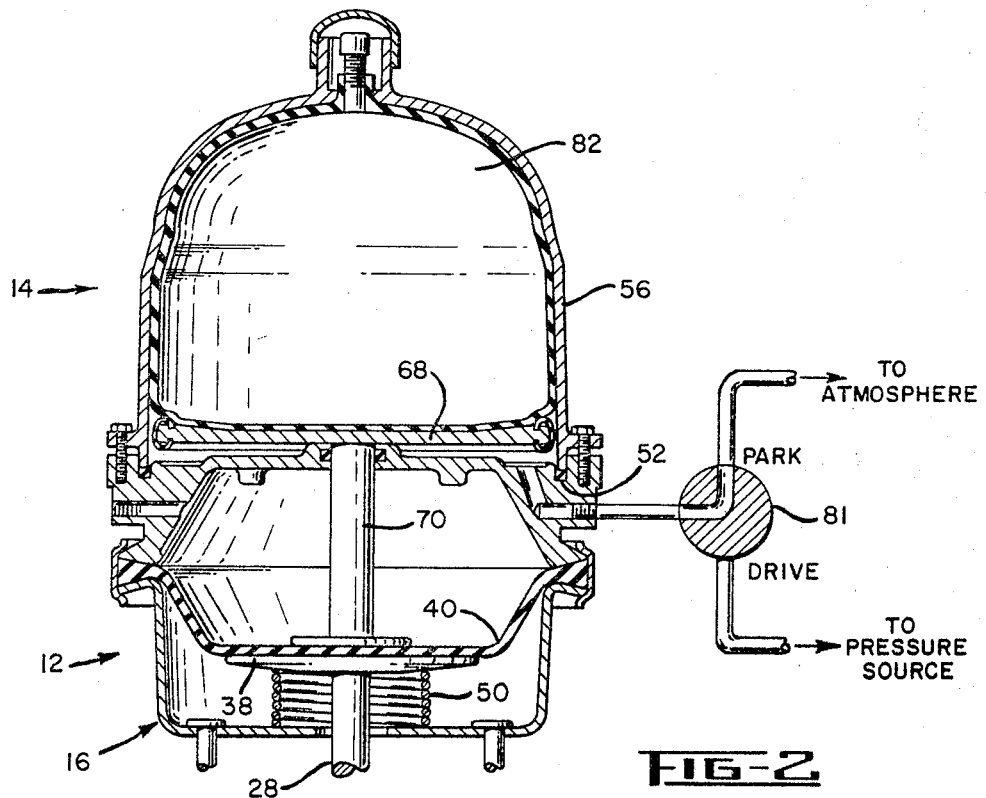
FIGURE 2 is a view similar to FIGURE 1 but showing the device in brake-applied condition by actuation of the parking brake unit.

The novel parking brake unit 14 of this invention includes a cylinder 56 which is closed at one end thereof by the inner wall member 22. As seen in FIGURES 1 and 2, the edge of the cylinder at the open lower end thereof is seated upon a seal ring 58 positioned in an annular groove 60 in the end wall portion 22a of the wall member 22 for sealing engagement between the cylinder and end wall. Radially extending bosses 62 with through holes therein are formed on the outside of the cylinder adjacent the open end thereof. Cap screws 64 extend through the holes in the bosses and threadly engage tapped holes in the end wall 22a to secure the cylinder to the end cap. Obviously, other suitable means may be employed for attaching the cylinder to the inner end wall member.

The cylinder 56 is formed with a side wall portion 65 and generally hemispherical or dome-shaped head 66 at one end thereof. A piston 68 is reciprocably mounted in the cylinder 56 and is provided with a push rod 70 centrally fastened thereto by any suitable means, not shown. The push rod extends through a central aperture 72 formed in the end of the inner end wall 22, and a seal ring 74 in a groove in the aperture provides a fluid tight seal between the wall and push rod. A pusher plate 76 in the form of a disc is secured by a screw 78 to the end of the push rod 70 within the chamber 42. When the piston 68 is actuated to the opposite end of the cylinder in the position illustrated in FIGURE 2, the pusher plate 76 engages the diaphragm to move the same and the attached brake actuating rod 28 downwardly into brake-applied position. A chamber 79 is formed in the cylinder 56 between the piston 68 and the inner wall member 22, and the parking brake device is normally maintained in the inoperative position illustrated in FIGURE 1 by application of air under pressure to said chamber through a port 80 in the wall member 22. As diagrammatically illustrated in FIGURE 1 the port 80 is connected to a parking brake valve 81. In the "drive" position of the valve illustrated in FIGURE 1 a fluid (e.g., air) under pressure is supplied to the chamber 79 for actuating the piston to the position shown in FIGURE 1. Upon actuation of the valve 81 to the opposite, or "park" position, the chamber 79 is vented to the atmosphere through the valve whereupon the piston 68 is moved into brake actuating position illustrated in FIGURE 2.

Movement of the piston 68 into the brake actuated position is accomplished in accordance with this invention by means of a pressurized air bag or bladder 82 which is included within the cylinder 56 at the side of the piston 68 opposite the chamber 79. The illustrated bladder is formed with a neck or protuberance 84 which extends through an aperture 86 in the end of the cylinder head 66. A hollow stem 88 extends through the neck 84 within which a one-way valve 90 is located. The stem 88 may be externally threaded to receive a dust cap 92. The cylinder head is formed with an outwardly projecting annular flange or wall 94 into which the protruding valve stem extends for the protection thereof. The end of the wall 94 may be closed by a protective cover 96 if desired. With the cap 92 and cover 96 removed, the bladder may be inflated through the hollow stem 88. In practice the valve 81 is opened to vent the chamber 79 to the atmosphere and the bladder 82 is inflated to expand the same and force the piston downwardly into the position shown in FIGURE 2 for application of the brake. The bladder is inflated to a pressure required to provide the desired brake-applied pressure. In one arrangement the bladder is inflated to a pressure of about 40 p.s.i. in the expanded bladder condition illustrated in FIGURE 2. When the bladder is inflated to the desired pressure the caps 92 and cover 96 may be replaced.

In the construction illustrated in FIGURES 1 and 2 the piston is shown provided with a seal ring or band 100 having a generally C-shaped cross section. The upper and lower inwardly curved edges of the ring engage annular grooves 106 formed in the top and bottom of the piston. The sealing ring or band is made of a suitable material such as rubber or plastic and may be stretched over the edge of the piston into engagement therewith as illustrated.

A stop means for the piston at the brake-released end of the piston stroke is provided by a tapered section 110 formed on the cylinder wall adjacent to the upper end of the piston stroke. When the piston is actuated to the brake-released position illustrated in FIGURE 1, the seal band 100 is wedged between the piston and tapered cylinder wall section 110 to provide a fluid tight seal thereat. Thus, in addition to stopping the piston travel, a fluid tight seal is provided between the piston and cylinder when the seal band 110 is wedged therebetween to prevent leakage of fluid from the chamber 79, past the edge of the piston, and thence between the bladder and piston head. If such leakage occurred the pressure at the opposite sides of the piston could equalize and, since the area of the piston at the upper side thereof is greater than that of the lower side (due to the presence of the push rod 70 at the lower side) a differential force would be created on the piston to drive the same back down to brake-applied position. This, as mentioned above, is prevented by providing a sealing engagement between the piston and cylinder at the upper end of the piston stroke. The cylinder wall must be tapered at a sufficient angle at the stop means 110 to prevent an excessively tight wedging action. However, if the taper is too great the bladder may distend and be pinched between the piston and cylinder when the piston is driven to the brake-relieved position. In practice a taper of about 5 degrees has been found to be satisfactory. As an alternative construction the bladder could be cemented or otherwise suitably affixed to the head of the piston to prevent the leakage of air under pressure between the bladder and piston.

The cylinder 56 may be made of any suitable material and by means of any suitable process. A cast aluminum cylinder has been found satisfactory. If the cylinder is cast the side wall 65 thereof will taper slightly to a larger diameter at the lower open end thereof to facilitate the removal of the mold therefrom in the casting process. With this construction the piston fits loosely at the lower end of the stroke as seen in FIGURE 2. This taper does not adversely effect the operation of the parking brake unit since there is no requirement that a fluid tight seal be maintained at all times between the piston and the cylinder. During actuation of the piston from the brake-applied position shown in FIGURE 2 to the brake-release position shown in FIGURE 1 only a small differential exists between the pressure of the bladder and the pressure in the chamber 79 which differential is insufficient to result in the leakage of air from the chamber 79 to the top of the piston adjacent the bladder. However, when the piston 68 is stopped at the top of the stroke by the tapered wall section 110, the pressure in the chamber 79 will continue to build up to the pressure of the supply source connected thereto through the valve 81. This source may be at a pressure of say 150 p.s.i. When the bladder 82 is compressed at the end of the piston stroke the pressure may rise to say about 80 p.s.i. Under these conditions a pressure differential of about 70 p.s.i. exists between the opposite sides of the piston 68, and air from the chamber 79 must be prevented from leaking to the top of the piston to prevent actuation of the piston into the brake-applied position under such conditions. The air pressure values mentioned above are merely illustrative of typical pressures and the invention is not limited thereto.

One advantage of this invention over prior art arrangements which utilize a heavy duty compression spring for actuation of the parking brake is the fact that the bladder life far exceeds the life of the normal compression spring. Further, the apparatus of this invention may be easily assembled and disassembled when the bladder is deflated. With prior art spring arrangements. the spring is under compression at all times and great care must be taken in the assembly and disassembly of such units. Also, by eliminating the heavy duty compression spring, the weight of the unit may be reduced.

Figure 3:
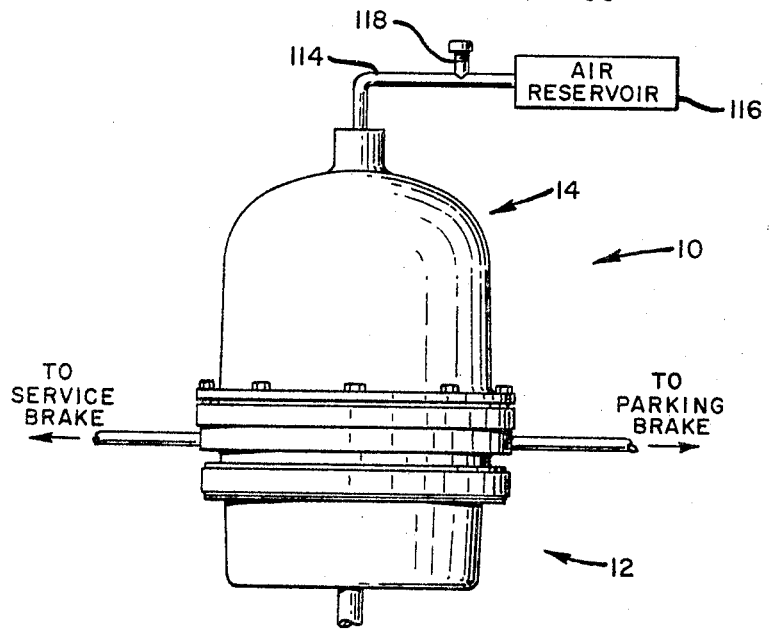
FIGURE 3 is an elevational view of the brake operating device shown in FIGURE 1 and including a diagrammatic showing of an air reservoir connected to the bladder thereof.

In the brake unit illustrated in FIGURES 1 and 2 the bladder volume may approximately double between the brake-released position shown in FIGURE 1 and the brake-applied condition shown in FIGURE 2. The point in the piston stroke at which the brakes are applied depends upon the adjustment of the brake elements and the linkage thereto. With the brakes properly adjusted they will be applied adjacent the beginning of the stroke, and as they become worn, the length of stroke will increase. As the bladder expands the force which is supplied thereby decreases. From the general gas law it is known that for any given mass of gas, the product of the gas pressure and volume is equal to the product of the temperature and a constant. Obviously, if the temperature is constant, the product of gas pressure and volume is also constant. Thus, if the volume of the bladder doubles between brake-released position and brake-applied position, the pressure is approximately halved. In order to minimize the change in bladder pressure between brake-released and brake-applied positions, the change in air volume must be minimized. This may be accomplished by use of a large volume cylinder. In some vehicles the space provided for the installation of the brake units is extremely limited and a compact brake unit is required. Under such circumstances the modification of the invention illustrated in FIGURE 3 may be employed. There, a brake unit 10 is shown which is similar to the unit shown in FIGURES 1 and 2 and described above, which unit includes a service brake section 12 and parking brake section 14. The loading valve 90 (see FIGURE 1) is removed from the valve stem 88 and the stem is connected through an air line 114 to an air reservoir or tank 116. A loading valve 118 comprising a one way valve communicates with the line 114 for pressurization of the air bladder and air reservoir. With the additional mass of air supplied by the reservoir 116 a much smaller percentage change in air volume and much smaller absolute change in air pressure occurs between the brake-applied and brake-released positions.

Figure 4:
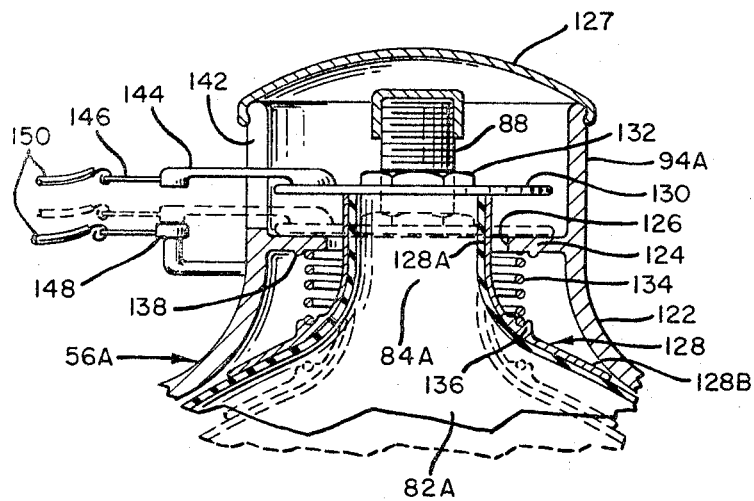
FIGURE 4 is an enlarged fragmentary sectional view of a modified brake operating mechanism which includes a novel alarm device connected thereto to indicate a low pressure condition of said bladder.

If desired, a novel indicator may be included in the construction of the cylinder for indicating a low bladder pressure condition. One embodiment of such an indicator is shown in FIGURE 4 to which figure reference is now made. In FIGURE 4 an enlarged fragmentary portion of the generally hemispherical shaped upper end of a cylinder designated 56A is shown which cylinder is formed with a generally tapered neck 122 having a flat top wall 124 thereon with a central aperture 126 therethrough. An annular flange or wall 94A projects from the upper end of the neck 122, the open end of which may be closed by a cap 127.

An inflatable air bag or bladder 82A is formed with a neck 84A over which a metal collar 128 is positioned, which collar has a generally cylindrical shaped upper end 128A which terminates in an outwardly flared lower end 128B. The bladder neck and collar extend through the aperture 126 and a flat washer 130 is attached to the top of the neck by a nut 132 on the threaded stem 88. The washer is located outside of the top wall 124 within the wall 94A. With the bladder 82A inflated to the required air pressure, the neck of the bladder extends outwardly through the opening 126 and inside the wall 94A as shown in solid lines. A compression spring 134 surrounds the sleeve 128 and abuts the flanged portion 128B thereof at one end and the inner surface of the end wall 124 of the cylinder at the other end. Annular spring retaining rings 136 and 138 integrally formed on the sleeve 128 and wall 124 center the spring in proper position on the sleeve.

As mentioned above, with the bladder properly inflated the spring 134 is compressed and the lower edge of the sleeve 128 engages the inside wall of the cylinder end as shown by solid lines. When the bladder pressure drops below a predetermined value, the spring 134 expands to force the neck of the bladder downwardly into the cylinder. Engagement of the washer 130 with the top wall 124 of the cylinder as shown in broken lines limits the distance the bladder may be urged into the cylinder by the spring. A spring of any desired strength may be employed for actuation of the indicator at the desired predetermined low pressure. The extent to which the valve stem 88 itself projects from the cylinder provides a visual indication of the bladder conditions. If desired, an axial slot 142 may be formed in the wall 94A through which slot an arm member 144 extends. The arm 144 is attached at one end to the washer 130 for movement therewith. Movement of the arm likewise provides a visual indication of the bladder condition. In addition, if desired, the arm 144 may carry an electrical contact element 146 at the outer end thereof, adapted for cooperation with a fixed electrical contact element 148. The contacts may be connected through lead wires 150 to any suitable electrically controlled indicator, not shown. Such indicator may be remotely located in the cab of the vehicle near the operator, if desired. The novel alarm does not interfere with the operation of the brake yet provides a positive indication of a low bladder pressure condition.

A modified form of brake-operating device is shown in FIGURE 5 and a novel brake system employing two such devices is shown in FIGURE 6. Referring first to FIGURE 5 a brake unit 153 is therein illustrated which comprises a cylinder 56 with a piston 68 reciprocably mounted therein. An inflatable bladder 82 bears against the piston. The cylinder, piston and bladder may be of the same design as shown in FIGURES 1 and 2 and described above.

The open end of the cylinder is closed by an end cap or wall 154 secured thereto by cap screws 64 which extend through apertures in bosses 62 on the cylinder and threadedly engage tapped holes 156 in the end cap. A seal ring 58 in an annular groove 158 in the inner face of the end cap provides for a sealing engagement between the end cap and cylinder. A brake operating rod 160 is rigidly fixed to the center of the piston and projects through a central aperture 161 in the end wall. A guide sleeve or bushing 162 in the aperture 161 slidably supports the rod 160 in the end cap, and a seal ring 164 in an annular groove in the end cap provides a sealing engagement between the reciprocable brake operating rod and the end cap. Mounting studs 166 extending from the end cap are employed to attach the brake unit to a mounting bracket 168, a portion of which is shown in FIGURE 5. Nuts 170 on the studs may be tightened to secure the brake unit to the bracket.

A flexible boot or sleeve 172 made of rubber, leather, plastic, or the like, covers a portion of the projecting brake operating rod 160 to prevent dirt from entering the bearing surface. An axial flange 174 with an annular groove 176 therein is formed on the end cap, and an annular bead 178 formed on the inside of the flexible sleeve 172 at one end thereof engages the groove 176 to fix the sleeve thereto. The other end of the sleeve 172 is attached to the brake operating rod by a resilient split ring 180 which surrounds the sleeve. The split ring depresses the sleeve into an annular groove 182 in the rod to fix the same thereto.

A port 184 is formed through the end plate 154 for communication with the chamber 79 formed inside the cylinder between the piston 68 and the end plate 154. In the manner described above, the bladder is pressurized and normally urges the piston downwardly into brake-applied position. Air under pressure may be introduced into the chamber 79 through the port 184 to urge the piston upwardly into brake-released position shown in full lines in FIGURE 5. As with the arrangement shown in FIGURES 1 and 2, upward movement of the piston may be stopped by engagement of the piston with the tapered stop section 110 at the upper end of the cylinder side wall. An air supply source at a pressure greater than the maximum bladder pressure is employed to drive the piston into the full brake-released position. When the chamber 79 is vented to the atmosphere through the port 184, the piston is urged downwardly into brake-applied condition by the inflated bladder 82.

The novel brake unit shown in FIGURE 5 may be employed for both service and parking brake functions. A novel brake system diagrammatically illustrated in FIGURE 6 shows two of the units 153 and the connections thereof to a source of air under pressure. As will become apparent hereinbelow additional brake units may be connected in parallel to the two units 153 for actuation of additional brake shoes at other wheels of the vehicle. Referring to FIGURE 6, a single tube 186 connects to each of the brake units 153, which tubes 186 communicate directly with the chamber 79 in the brake units through the ports 184 shown in FIGURE 5 and described above. The tubes connect together and through a line 188 to the port 190 of a three-position valve 192. The port 190 communicates with a manifold 194 in the valve body. By manual rotation of the rotatable valve member 196 the port 190 may be connected to "park," "drive" or "emergency release" ports 200, 202 and 204, respectively, through a passage 206 in the rotatable valve member 196. The port 200 communicates with the atmosphere through a line 208 for venting the air from the brake unit chambers 79 when the control valve 192 is in the "park" position.

The port 202 at the illustrated "drive" position of the valve 192 is connected through a line 210 to an air pressure modulating valve 212 of any suitable design. The valve 212 is located in the cab of the vehicle and is provided with a foot pedal 214 for actuation by the vehicle driver. In the unactuated position of the foot pedal the valve is open for communication between the inlet and outlet lines thereof at 215 and 210, respectively. In accordance with this invention the valve 212 is supplied by a constant pressure air supply source. In FIGURE 6 an air compressor 216 driven by any suitable means, not shown, is connected by a tube 218 to an air reservoir 220 which, in turn, is connected through a tube 222 to a pressure regulating valve 224. The output from the pressure regulator 224 is connected through the tube 215 to the inlet of the valve 212. With the control valve 192 in the illustrated drive position air under regulated pressure is delivered to the brake units so long as the valve 212 remains in the unactuated normal open position. The regulator 224 is adjusted for an outlet pressure which is slightly greater than the maximum bladder pressure when the brake units are in their brake-released condition. For example, for a maximum bladder pressure of 80 p.s.i., a regulator outlet pressure of about 85 p.s.i. may be employed. A typical air compressor 216 may provide a pressure of about 125 p.s.i. In this case the pressure would be reduced 40 p.s.i. by the regulator 224 to the desired 85 p.s.i. The reason a regulated supply is employed will become apparent in the description of the operation of the system hereinbelow.

The port 204 at the "emergency release" position of the valve connects through line 228 to a second air reservoir 230 which is supplied with air under pressure from the first reservoir 220 through a check valve 232. Consequently, air under pressure is available for release of the brakes if the air compressor 216 ceases to function or if a leak develops in the lines 210, 215, 218 or 222, or any of the components therein.

The connection of the brake actuating rods 160 to the brake elements is conventional and each may include a yoke member 234 threadedly attached to the threaded free end of the rod 160. A pin 236 pivotally connects the yoke to one end of a lever arm 238. The other end of the lever arm is fixed to a brake operating cam shaft 240 which functions to apply the brakes when the rod 160 is extended from the cylinder and releases the brakes when the rod 160 is retracted into the cylinder.

In the operation of the novel brake system, the valve 192, which is located in the vehicle cab, is rotated by the driver to the illustrated "drive" position when it is desired to operate the vehicle. The regulated source of air supply is thereby connected through the valves 212 and 192 to the brake units 153 to actuate the same to the brake-released position in the manner described above. When it is desired to stop the vehicle, the foot pedal 214 is depressed to reduce the air pressure to the brake units. If the pedal 214 is depressed completely the line 215 from the regulator is shut off and the line 210 which connects to the brake units is vented to atmosphere by means of the valve 212. The brakes are thereby applied by the expansion of the bladder in the manner described above. When the foot pedal is released, the valve 212 returns to its normal open position for communication between the lines 210 and 215 for release of the brakes. In the brake-release condition of the brake units the air pressure from the regulator 224 only slightly exceeds the bladder pressure. Therefore, when the brakes are to be applied by venting of the chambers 79 (see FIGURE 5) the chamber pressure need be reduced only a small amount before braking action is effected. If the air pressure in the chamber 79 was allowed to build up to a much larger value, say to the pressure at the outlet from the air reservoir 220, an excessively long time would be required for the pressure in the chamber 79 to reduce a sufficient amount for actuation of the brakes upon actuation of the valve 212. By limiting the air pressure to the brakes, the time delay between actuation of the valve 212 and actuation of the brake units 153 is minimized.

If, for any reason, the air pressure at the air reservoir 220 falls below a value sufficient to contract the bladder, the bladder will expand to actuate the brakes. For example, if a leak develops in the system between the air compressor and brake valve 212 while the valve 192 is in the illustrated "drive" position, and thereby reducing the pressure to the brake units sufficiently, the brakes will be applied. This constitutes a highly desirable safety feature. With the brakes thus applied, however, the vehicle cannot be moved. If the system cannot be repaired immediately and the vehicle must be moved the brakes may be released by actuating the valve 192 to the "emergency release" position. In this position the brake units 153 are supplied with air under pressure from the reservoir 230 for actuation of the brake operators to the brake-released position. The number of times which the brakes may be released depends among other things upon the volume of the reservoir 230 and the pressure of the air therewithin.

With the novel brake system described above the amount of tubing or piping is greatly reduced from that required in many prior art brake arrangements. With only a single air line to each of the brake units, the units function either as parking brakes or as service brake operators. Additionally, by simply including the check valve 232, air reservoir 230 and a suitable control valve, the system is provided with an emergency release means for controlled release of the brakes upon failure of another part of the system.

I claim:
1. A brake operator for actuation of vehicle brake means between brake applied and brake released conditions, said operator comprising, a closed expansible chamber including a cylinder and a member reciprocably movable within said cylinder, means for connecting said movable member to said vehicle brake means for actuation thereof, captive gas under pressure within said closed expansible chamber at one side of the movable member to urge said movable member in one direction for application of said brake means, means for introducing fluid under pressure to the other side of said movable member to move the same in the other direction for release of said brake means, and said chamber including a bladder abutting said movable member at one side thereof and containing the captive gas.

2. A brake operator for actuation of vehicle brake means between brake applied and brake released conditions, said operator comprising, a closed expansible chamber including a cylinder and a member reciprocably movable within said cylinder, means for connecting said movable member to said vehicle brake means for actuation thereof, captive gas under pressure within said closed expansible chamber at one side of the movable member to urge said movable member in one direction for application of said brake means, means for introducing fluid under pressure to the other side of said movable member to move the same in the other direction for release of said brake means and a remote reservoir for gas under pressure, and means connecting said reservoir to said chamber for bi-directional flow of gas therebetween.

3. A parking brake unit for use with a service brake of the type comprising a housing with a flexible diaphragm therein which together with an end wall on the housing defines a chamber adapted to be pressurized for actuation to brake applied position and vented for brake release, said parking brake unit comprising a cylinder closed at one end by said service brake housing end wall, a piston reciprocably movable in said cylinder, a pusher rod fixed at one end to said piston and projecting through an aperture formed through said end wall for pressing against said diaphragm, a closed inflatable resilient chamber pressurized with captive gas under pressure within said cylinder and abutting said piston for urging said piston toward said end wall, and port means for introducing fluid under pressure to said cylinder adjacent said end wall for driving said piston in the direction of said chamber thereby to compress the same, said piston being driven toward said end wall by expansion of said chamber when the fluid pressure in said cylinder is released to actuate the device to brake-applied position through said pusher rod.

4. The parking brake unit recited in claim 3 including a remote pressure reservoir, and means connecting said reservoir to said chamber for bidirectional communication therebetween.

5. A brake operating device comprising a service brake housing, a parking brake cylinder, an inner end wall common to both said housing and cylinder, a flexible diaphragm within said housing and peripherally secured in place, a brake operating rod attached to said diaphragm and extending from one side thereof and projecting from said housing, means relatively lightly resiliently biasing said diaphragm toward said common inner wall into brake-released condition, first port means for introducing fluid under pressure to said housing adjacent said common inner wall at the other side of said diaphragm for urging said diaphragm and attached rod away from said common inner wall into brake-applied position, a piston reciprocably movable in said parking brake cylinder, a pusher rod fixed at one end to said piston, said pusher rod projecting through and slidably engaging an aperture formed through said common inner end wall for pressing against said diaphragm, a pressurized inflatable resilient bladder supplied with captive gas under pressure within said cylinder and abutting said piston for urging said piston toward said common inner wall into brake-applied position, and second port means for introducing fluid under pressure to said cylinder adjacent said common inner end wall for driving said piston toward the other end of the cylinder thereby to compress said bladder, said piston being driven toward said common inner wall by expansion of said resilient bladder when the fluid pressure in said cylinder is released to actuate said brake operating rod through said pusher rod.

6. A brake system for use on a vehicle having brake means movable between brake-applied and brake-released positions, said system comprising a brake operator connected to said brake means for actuating the same, said brake operator including a closed pressurized chamber containing captive gas under pressure for urging said brake means into brake applied position, a source of fluid under pressure, a modulating valve connecting said fluid pressure source to said brake operating device for compressing said captive gas and urging said brake means into brake-released position, the fluid pressure applied to said brake operating device being controllable by said modulating valve for service braking of the vehicle.

7. The brake system recited in claim 6 including a control valve movable between "drive" and "park" positions for connection of the brake operator to said modulating valve and to the atmosphere, respectively, said brake means being actuated into brake-applied position by said captive gas under pressure of said brake operator in the "park" position of said control valve.

8. The brake system recited in claim 6 wherein said closed pressurized chamber for said brake operator comprises an expandable inflated bladder.

9. The brake system recited in claim 8 wherein the source of fluid pressure is regulated for a maximum pressure at said brake operating device which only slightly exceeds that required to fully compress said inflated bladder.

10. The brake system recited in claim 6 including a reserve air tank, a check valve connecting said tank to said source of fluid pressure for pressurization of said tank, and means for connecting said tank to said brake operating device for actuation to brake-released condition for emergency release thereof.

11. A brake operator for actuation of vehicle brake means between brake applied and brake released conditions, said operator comprising a cylinder, a piston reciprocably movable within said cylinder, means for connecting said piston to said vehicle brake means for actuation thereof, means for applying fluid pressure to one side of said piston to urge said piston in one direction for application of said brake means, means for introducing fluid under pressure to the other side of said piston to move the same in the other direction for release of said brake means, and piston stop means comprising an inwardly tapered cylinder wall portion for wedging engagement with said piston at the brake-released end of the piston stroke.

12. The brake operator recited in claim 11 wherein said tapered cylinder wall stop means tapers at about 5 degrees with the cylinder axis.

13. A parking brake unit for use with a service brake of the type comprising a housing with a flexible diaphragm therein which, together with an end wall on the housing, defines a chamber adapted to be pressurized for actuation to brake applied position and vented for brake release, said parking brake unit comprising a cylinder closed at one end by said service brake housing end wall, a piston reciprocably movable in said cylinder, a pusher rod fixed at one end to said piston and projecting through an aperture formed through said end wall for pressing against said diaphragm, an inflatable resilient chamber within said cylinder and abutting said piston for urging said piston toward said end wall, port means for introducing fluid under pressure to said cylinder adjacent said end wall for driving said piston in the direction of said chamber thereby to compress the same, said piston being driven toward said end wall by expansion of said chamber when the fluid pressure in said cylinder is released to actuate the device to brake-applied position through said pusher rod, and a piston stop means comprising an inwardly tapered cylinder wall portion for wedging engagement with said piston at the brake-released end of the piston stroke.

14. The parking brake unit recited in claim 13 wherein said tapered cylinder wall stop means tapers at about 5 degrees with the cylinder axis.

15. A parking brake unit for use with a service brake of the type comprising a housing with a flexible diaphragm therein which together with an end wall on the housing defines a chamber adapted to be pressurized for actuation of the brake means to brake applied position and vented for brake release, said parking brake unit comprising:

a cylinder closed at one end by said service brake housing end wall, a piston reciprocably movable in said cylinder, a pusher rod fixed at one end to said piston and projecting through an aperture formed through said end wall for pressing against said diaphragm, a closed chamber including the piston and cylinder at the end opposite said end wall, captive gas under pressure within said closed chamber to urge the piston in one direction for application of the brake means, port means for introducing fluid under pressure to said cylinder adjacent the end wall for driving the piston in the direction of said closed chamber to compress the captive gas under pressure therein, said piston being driven toward said end wall by expansion of said captive gas when the fluid pressure in said cylinder is released for actuation to brake-applied position through said pusher rod.

References Cited

UNITED STATES PATENTS

| | | | |
|---|---|---|---|
| 2,597,050 | 5/1952 | Audemar | 60—54.5 |
| 2,781,870 | 2/1957 | Clements | 188—151 |
| 2,817,421 | 12/1957 | Bricker | 92—134 X |
| 2,854,954 | 10/1958 | Howze | 92—63 |
| 3,043,633 | 7/1962 | Hubscher | 303—71 X |
| 3,163,092 | 12/1964 | Masser | 303—71 X |
| 3,176,594 | 4/1965 | Cruse | 92—63 X |
| 3,272,566 | 9/1966 | Clack | 303—13 |
| 2,820,434 | 1/1958 | Otto | 92—94 |

MILTON BUCHLER, *Primary Examiner.*

J. J. McLAUGHLIN, *Assistant Examiner.*

U.S. Cl. X.R.

92—5, 63, 64, 92, 134; 303—2, 13, 17